US005895495A

United States Patent [19]
Arimilli et al.

[11] Patent Number: 5,895,495
[45] Date of Patent: Apr. 20, 1999

[54] DEMAND-BASED LARX-RESERVE PROTOCOL FOR SMP SYSTEM BUSES

[75] Inventors: Ravi Kumar Arimilli, Austin; John Steven Dodson, Pflugerville; Jerry Don Lewis, Round Rock; Derek Edward Williams, Austin, all of Tex.

[73] Assignee: International Business Machines Corporation, Armonk, N.Y.

[21] Appl. No.: 08/815,647

[22] Filed: Mar. 13, 1997

[51] Int. Cl.$^6$ .................................................. G06F 13/16
[52] U.S. Cl. ........................... 711/156; 711/145; 711/122
[58] Field of Search ................................. 711/141, 122, 711/119, 121, 156, 143, 145, 146

[56] References Cited

U.S. PATENT DOCUMENTS

| | | |
|---|---|---|
| 5,155,832 | 10/1992 | Hunt . |
| 5,262,109 | 11/1993 | Cook . |
| 5,276,848 | 1/1994 | Gallagher et al. . |
| 5,369,753 | 11/1994 | Tipley . |
| 5,426,754 | 6/1995 | Grice et al. .......................... 711/124 |
| 5,428,761 | 6/1995 | Herlihy ............................... 711/130 |
| 5,524,233 | 6/1996 | Milburn et al. ...................... 711/141 |
| 5,551,007 | 8/1996 | Miyazaki et al. . |
| 5,553,310 | 9/1996 | Taylor et al. . |
| 5,655,103 | 8/1997 | Cheng et al. ........................ 711/152 |
| 5,706,464 | 1/1998 | Moore et al. ........................ 711/122 |
| 5,742,785 | 4/1998 | Stone ................................. 395/393 |
| 5,758,119 | 5/1998 | Mayfield et al. ..................... 1/1 |

Primary Examiner—Tod R. Swann
Assistant Examiner—Christopher S. Chow
Attorney, Agent, or Firm—Richard A. Henkler; Jack V. Musgrove; Andrew J. Dillon

[57] ABSTRACT

A method of handling load-and-reserve instructions in a multi-processor computer system wherein the processing units have multi-level caches. Symmetric multi-processor (SMP) computers use cache coherency to ensure the same values for a given memory address are provided to all processors in the system. Load-and-reserve instructions used, for example, in quick read-and-write operations, can become unnecessarily complicated. The present invention provides a method of accessing values in the computer's memory by loading the value from the memory device into all of said caches, and sending a reserve bus operation from a higher-level cache to the next lower-level cache only when the value is to be cast out of the higher cache, and thereafter casting out the value from the higher cache after sending the reserve bus operation. This procedure is preferably used for all caches in a multi-level cache architecture, i.e., when the value is to be cast out of any given cache, a reserve bus operation is sent from the given cache to the next lower-level cache (i.e., the adjacent cache which lies closer to the bus), but the reserve bus operation is not sent to all lower caches. Any attempt by any other processing unit in the computer system to write to an address of the memory device which is associated with the value will then be forwarded to all higher-level caches. The marking of the block as reserved is removed in response to any such attempt to write to the address.

20 Claims, 4 Drawing Sheets

DEMAND-BASED LARX-RESERVE PROTOCOL FOR SMP SYSTEM BUSES

BACKGROUND OF THE INVENTION

1. Field of the Invention

The present invention generally relates to computer systems and more particularly to a method of handling instructions for operating a cache used by a computer processor.

2. Description of the Related Art

The basic structure of a conventional multi-processor computer system 10 is shown in FIG. 1. Computer system 10 has several processing units 12a, 12b, and 12c which are connected to various peripheral devices, including input/output (I/O) devices 14 (such as a display monitor, keyboard, and permanent storage device), memory device 16 (such as dynamic random access memory or DRAM) that is used by the processing units to carry out program instructions, and firmware 18 whose primary purpose is to seek out and load an operating system from one of the peripherals (usually the permanent memory device) whenever the computer is first turned on. Processing units 12a–12c communicate with the peripheral devices by various means, including a bus 20. Computer system 10 may have many additional components which are not shown, such as serial and parallel ports for connection to, e.g., modems or printers. Those skilled in the art will further appreciate that there are other components that might be used in conjunction with those shown in the block diagram of FIG. 1; for example, a display adapter might be used to control a video display monitor, a memory controller can be used to access memory 16, etc. The computer can also have more than three processing units.

In a symmetric multi-processor (SMP) computer, all of the processing units 12a–12c are generally identical; that is, they all use a common set or subset of instructions and protocols to operate and generally have the same architecture. A typical architecture is shown in FIG. 2. A processing unit 12 includes a processor 22 having a plurality of registers and execution units, which carry out program instructions in order to operate the computer. The processor can also have caches, such as an instruction cache 24 and a data cache 26. These caches are referred to as "on-board" when they are integrally packaged with the processor's registers and execution units. Caches are commonly used to temporarily store values that might be repeatedly accessed by a processor, in order to speed up processing by avoiding the longer step of loading the values from memory 16.

Processing unit 12 can include additional caches, such as cache 28. Cache 28 is referred to as a level 2 (L2) cache since it supports the on-board (level 1) caches 24 and 26. In other words, cache 28 acts as an intermediary between memory 16 and the on-board caches, and can store a much larger amount of information (instructions and data) than the on-board caches can, but at a longer access penalty. For example, cache 28 may be a chip having a storage capacity of 256 or 512 kilobytes, while the processor 12 may be an IBM PowerPC™ 604-series processor having on-board caches with 64 kilobytes of total storage. Cache 28 is connected to bus 20, and all loading of information from memory 16 into processor 12 must come through cache 28. Although FIG. 2 depicts only a two-level cache hierarchy, multi-level cache hierarchies can be provided where there are many levels of serially connected caches.

In an SMP computer, it is important to provide a coherent memory system, that is, to cause writes to each individual memory location to be serialized in some order for all processors. For example, assume a location in memory is modified by a sequence of writes to take on the values 1, 2, 3, 4. In a cache-coherent system, all processors will observe the writes to a given location to take place in the order shown. However, it is possible for a processing element to miss a write to the memory location. A given processing element reading the memory location could see the sequence 1, 3, 4, missing the update to the value 2. A system that implements these properties is said to be "coherent." It is important to note that virtually all coherency protocols operate only to the granularity of the size of a cache block. That is to say, the coherency protocol controls the movement of and write permissions for data on a cache block basis and not separately for each individual memory location.

There are a number of protocols and techniques for achieving cache coherence that are known to those skilled in the art. At the heart of all these mechanisms for maintaining coherency is the requirement that the protocols allow only one processor to have a "permission" that allows a write to a given memory location (cache block) at any given point in time. As a consequence of this requirement, whenever a processing element attempts to write to a memory location, it must first inform all other processing elements of its desire to write the location and receive permission from all other processing elements to carry out the write. The key issue is that all other processors in the system must be informed of the write by the initiating processor before the write occurs.

To further illustrate how cache coherence is implemented in multi-level hierarchies, consider FIG. 4. FIG. 4 shows an SMP computer system with three processing units (40, 41, 42) consisting of processors (40a, 41a, 42a) each having an L1 cache (40b, 41b, 42b), an L2 cache (40c, 41c, 42c), and finally, an L3 cache (40d, 41d, 42d). In this hierarchy, each lower-level cache (i.e., an L3 cache is "lower" than an L2) is typically larger in size and has a longer access time than the next higher-level cache. Furthermore, it is common, although not absolutely required, that the lower-level caches contain copies of all blocks present in the higher-level caches. For example, if a block is present in the L2 cache of a given processing unit, that implies the L3 cache for that processing unit also has a (potentially stale) copy of the block. Furthermore, if a block is present in the Li cache of a given processing unit, it is also present in the L2 and L3 caches of that processing unit. This property is known as inclusion and is well-known to those skilled in the art. Henceforth, it is assumed that the principle of inclusion applies to the caches related to the present invention.

To implement cache coherency in a system such as is shown in FIG. 4, the processors communicate over a common generalized interconnect (43). The processors pass messages over the interconnect indicating their desire to read or write memory locations. When an operation is placed on the interconnect, all of the other processors "snoop" this operation and decide if the state of their caches can allow the requested operation to proceed and, if so, under what conditions.

This communication is necessary because, in systems with caches, the most recent valid copy of a given block of memory may have moved from the system memory 44 to one or more of the caches in the system. If a processor (say 40a) attempts to access a memory location not present within its cache hierarchy (40b, 40c, and 40d), the correct version of the block, which contains the actual value for the memory location, may either be in the system memory 44 or in one of more of the caches in processing units 41 and 42. If the correct version is in one or more of the other caches in the system, it is necessary to obtain the correct value from the cache(s) in the system instead of system memory.

For example, consider a processor, say 40a, attempting to read a location in memory. It first polls its own L1 cache (40b). If the block is not present in the L1 cache (40b), the request is forwarded to the L2 cache (40c). If the block is not present in the L2 cache, the request is forwarded on to the L3 cache (40d). If the block is not present in the L3 cache (40d), the request is then presented on the generalized interconnect (43) to be serviced. Once an operation has been placed on the generalized interconnect, all other processing units "snoop" the operation and determine if the block is present in their caches. If a given processing unit, say 42, has the block of data requested by processing unit 40 in its L1 cache (42a), and that data is modified, by the principle of inclusion, the L2 cache (42c) and the L3 cache (42d) also have copies of the block (however, their copies are stale, since the copy in the processor's cache is modified). Therefore, when the L3 cache (42d) of processing unit 42 snoops the read operation, it will determine that the block requested is present and modified in a higher-level cache. When this occurs, the L3 cache 42c places a message on the generalized interconnect informing processing unit 40 that it must "retry" it's operation again at a later time, because the actual value of the memory location is in the L1 cache at the top of the memory hierarchy and must be retrieved to make it available to service the read request of processing unit 40.

Once the request from processing unit 40 has been retried, the L3 cache (42d) begins a process to retrieve the modified data from the L1 cache and make it available at the L3 cache 42d, main memory 44, or both, depending on the exact details of the implementation which are not specifically relevant to this invention. To retrieve the block from the higher-level caches, the L3 cache (42d) sends messages through the inter-cache connections (42x, 42y) to the higher-level caches (42c, 42d) requesting the block be retrieved. These messages propagate up the processing unit hierarchy until they reach the L1 cache and cause the block to be moved down the hierarchy to the lowest level (the L3 cache or main memory) to be able to service the request from processing unit 40.

Processing unit 40 specifically its L3 cache (40d) eventually represents the read request on the generalized interconnect. At this point, however, the modified data has been retrieved from the L1 cache of processing unit 42 and the read request from processor 40a will be satisfied. The scenario just described is commonly referred to as a "snoop push." A read request is snooped on the generalized interconnect which causes processing unit 42 to "push" the block to the bottom of the hierarchy to satisfy the read request made by processing unit 40.

The key point to note is that, when a processor wishes to read or write a block, it must communicate that desire with the other processing units in the system in order to maintain cache coherence. To achieve this, the cache-coherence protocol associates with each block in each level of the cache hierarchy, a status indicator indicating the current "state" of the block. The state information is used to allow certain optimizations in the coherency protocol that reduce message traffic on the generalized interconnect (43) and the inter-cache connections (40x, 40y, 41x, 41y, 42x, 42y). As one example of this mechanism, when a processing unit executes a read, it receives a message indicating whether or not the read must be retired later. If the read operation is not retried, the message usually also includes information allowing the processing unit to determine if any other processing unit also has a still active copy of the block (this is accomplished by having the other lowest-level caches give a "shared" or "not shared" indication for any read they do not retry). Therefore, a processing unit can determine whether any other processor in the system has a copy of the block. If no other processing unit has an active copy of the block, the reading processing unit marks the state of the block as "exclusive." If a block is marked exclusive it is permissible to allow the processing unit to later write the block without first communicating with other processing units in the system because no other processing unit has a copy of the block. Therefore, in general, it is possible for a processor to read or write a location without first communicating this intention onto the interconnection. However, this only occurs in cases where the coherency protocol has insured that no other processor has an interest in the block. Several details of the exact workings of a multi-level cache coherence protocol have been omitted in this discussion to simplify it. However, the essential aspects that bear on the invention have been described. Those aspects not described are well-known to those skilled in the art.

Another aspect of multi-level cache structures relevant to the invention, are the operations known as evictions. The blocks in any cache are divided into groups of blocks called "sets." A set is the collection of blocks that a given memory block can reside in. For any given memory block, there is a unique set in the cache that the block can be mapped into, according to preset mapping functions. The number of blocks in a set is referred to as the associativity of the cache (e.g., 2-way set associative means that, for any given memory block, there are two blocks in the cache that the memory block can be mapped into). However, several different blocks in main memory can be mapped to any given set.

When all of the blocks in a set for a given cache are full and that cache receives a request, be it a read or write, to a memory location that maps into the full set, the cache must "evict" one of the blocks currently in the set. The cache chooses a block by one of a number of means known to those skilled in the art (least recently used (LRU), random, pseudo-LRU, etc.) to be evicted. If the data in the chosen block is modified, that data is written to the next lowest level in the memory hierarchy which may be another cache (in the case of the L1 or L2 cache) or main memory (in the case of an L3 cache). Note that, by the principle of inclusion, the lower level of the hierarchy will already have a block available to hold the written modified data. However, if the data in the chosen block is not modified, the block is simply abandoned and not written to the next lowest level in the hierarchy. This process of removing a block from one level of the hierarchy is known as an "eviction." At the end of this process, the cache no longer holds a copy of the evicted block and no longer actively participates in the coherency protocol for the evicted block because, when the cache snoops an operation (either on the generalized interconnect 43 or the inter-cache connections 40x, 41x, 42x, 40y, 41y, 42y) the block will not be found in the cache.

Another aspect of symmetric multiprocessors is relevant to the invention. In symmetric multiprocessors, it is necessary to provide a means of synchronizing the actions of the various processors in a system to allow cooperation among processors working on a task. To achieve this, most modern processors include in their instruction sets explicit instructions to handle synchronization. In particular, the PowerPC™ instruction set provides two instructions known as "lwrx" and "stcx." These instructions come in two forms: "lwarx" and "stwcx" for 32-bit implementations and "ldarx" and "stdcx" for 64-bit implementations. Henceforth, the terms "lwarx" and "stwcx" are used to denote instructions for either implementation (the ldarx and stdcx instructions have essentially the same semantics with the exception that ldarx and stdcx operate on 8-byte quantities, and lwarx and stwcx operate on 4-byte quantities). These instructions serve to build synchronization primitives.

The lwarx instruction loads an aligned 4-byte word of memory into a register in the processor. In addition, lwarx places a "reservation" on the block of memory that contains the word of memory accessed. In most implementations, the reservation is placed on a block that is the same size as the block size used in the cache coherency protocol. A reservation contains the address of the block and a flag. This flag is made active, and the address of the block is loaded when a lwarx instruction successfully reads the word of memory referenced. If a reservation is valid (the flag is active) the processor and the memory hierarchy are obligated to cooperatively monitor the entire system for any operation that may write to the block for which the reservation exists. If such a write occurs, the flag in the reservation is reset. The reservation flag is used to control the behavior of the stwcx instruction.

The stwcx instruction is the counterpart to lwarx. The stwcx instruction first determines if the reservation flag is valid. If so, the stwcx instruction performs a store to the 4-byte word of memory specified, sets a condition code register to indicate that the store succeeded, and resets the reservation flag. If, on the other hand, the reservation flag in the reservation is not valid, the stwcx instruction does not perform a store to memory and sets a condition code register indicating that the store failed. The stwcx instruction is often referred to as a "conditional store" due to the fact that the store is conditional on the status of the reservation flag.

The general concept underlying the lwarx/stwcx instruction sequence is to allow a processor to read a memory location, modify the location in some way, and to store the new value to memory while ensuring that no other processor has altered the memory location from the point in time when the lwarx was executed until the stwcx completes. Such a sequence is usually referred to as an "atomic read-modify-write" sequence because the processor was able to read the location, modify it, and then write the new value without interruption by another processor writing to the location. The lwarx/stwcx sequence of operations does not occur as one uninterruptable sequence, but rather, the fact that the processor is able to execute a lwarx and then later successfully complete the stwcx ensures the programmer that the read-modify-write sequence did, in fact, occur as if it were atomic. This atomic property of a lwarx/stwcx sequence can be used to implement a number of synchronization primitives well-known to those skilled in the art.

From the descriptions of cache coherency and the semantics of the lwarx/stwcx instruction, it should be clear that there is a strong relationship between these two aspects of a symmetric multiprocessor system. The cache-coherency protocol seeks to control when processors can write to a memory location by serializing all writes to a given memory location in a certain order that all processors observe. To achieve this aim, the cache coherency protocol requires that a processor that wishes to write to a memory location inform all other processors (if any others have an interest in the block) of the desire to execute a write and obtain permission from these other processors before executing the write. Thus, information about writes to all memory locations is communicated throughout the system as writes are attempted. The lwarx/stwcx instructions, in contrast, seek to ensure that, once a lwarx is executed, any writes that occur after the lwarx that could potentially alter the memory location loaded by the lwarx will invalidate the reservation flag in the processor and thereby prevent the stwcx from storing to memory. Both of these goals rely on being able to determine when writes to memory locations occur. In fact, most implementations of the lwarx/stwcx instruction semantics rely on already existing cache-coherency protocol to aid in ensuring the lwarx/stwcx sequences are, in fact, atomic. Virtually all current implementations make the reservation valid for an aligned block of memory the same size as the block size used by the cache-coherency algorithm. This block is referred to as a reservation granule. This construction allows the mechanisms that implement lwarx/stwcx instruction semantics to re-use the messages that are communicated throughout the system for cache coherency to also aid in maintaining the semantics of lwarx/stwcx instructions. As a consequence of this implementation, any write that occurs to any location within the reservation granule will cancel the reservation, even if that write did not alter the particular location that was loaded by the lwarx instruction. This lack of precision in resetting the reservation flag is a typical trade-off made in implementations to allow the re-use of the cache-coherency messages as a means of implementing lwarx/stwcx instruction semantics.

To further understand how cache coherency and the implementation of lwarx/stwcx sequences are related, refer to FIG. 5, which shows one processing unit with the additional constructs necessary to support lwarx/stwcx explicitly shown (note that the processing units in FIG. 4 include these same constructs even though they are not explicitly shown in FIG. 4). For each cache in FIG. 5, there is a reservation unit (50a, 50b, 50c). These units contain the reservation, both the address (50d, 50e, 50f) and the flag (50g, 50h, 50i). These units each snoop their respective buses (51, 52, 53) for any write operation within the reservation granule address (50d, 50e, 50f) and invalidate the flag (50g, 50h, 50i) when such an operation is detected. As such, the reservation units are a party to the cache-coherency scheme. They monitor the buses and respond to bus transactions in a manner similar to the caches themselves.

In the prior art, the reservation unit addresses and flags are set in one of two general ways. At one extreme, if a processor attempts to issue a lwarx to a memory location whose block is not present in any cache of it's memory hierarchy, a read operation is propagated from the processor at the top of the hierarchy through each of the caches in the hierarchy and finally out on the generalized interconnect to be serviced, as was described earlier. However, unlike the earlier example, these read operations are tagged with a special indicator to inform the reservation units in the caches that the read is for a lwarx and that the reservation units should set the address and flag. At the other extreme, a processor can issue a lwarx to a memory location in a block already present in the L1 cache. This situation is known as an "lwarx hit." In this case, the processor's reservation unit will set its reservation address and flag (50d and 50g, respectively) and will issue a special bus operation know as a lwarx reserve (hereafter RESERVE) on the connection between the L1 and L2 cache (51). The L2 cache will receive the RESERVE message, which includes the address of the reservation, and will set its reservation address (50e) and flag (50h). In addition, the L2 cache will forward the RESERVE message on to the L3 cache which will repeat the actions taken by the L2 cache; at which point, all the reservation units will be properly set. Note that the process of propagating the RESERVE messages from L1 to L3 can take an arbitrary amount of time, in general, depending on availability of the inter-cache connections (51 and 52) and specific details of the particular implementation.

There is one other way the reservation units can be set. This situation occurs when a block has been partially, but not completely, evicted from a cache hierarchy. For example, assume that the processor executes a lwarx instruction to an address that is in a block not present in the L1 cache, but is present in the L2 cache (and by the inclusion principle, the L3 cache). In this case, the processor will issue a read that is marked as a read for a lwarx to the L2 cache. The L2 cache will determine that it has a copy of the block and return this block to the processor directly. Once the block is returned to the processor, the processor updates its reservation address and flag. The L2 cache will also set its reservation and send a RESERVE bus operation to the L3 cache to inform the L3 cache of the reservation. This scenario is merely a combination of the two cases described earlier. In general, a read from the processor with the lwarx indication propagates down the hierarchy setting reservation units until it encounters a cache that has a copy of the block which satisfies the read. That cache then propagates a RESERVE bus operation down the remainder of the hierarchy to set the remaining reservation units.

In this manner, all of the reservation units in the hierarchy are loaded as a result of a lwarx instruction with the proper reservation information and can begin snooping for transactions that write to the reservation granule. This allows the reservation units to reset the reservation flags and prevent a stwcx instruction from completing when the memory location for the reservation could have potentially been modified.

To illustrate the interplay between cache coherency and the reservation units, consider the second case discussed earlier where a processor executes a lwarx to a location present in the L1 cache. The processor will set its reservation and present a RESERVE bus operation on the inter-cache connection between the L1 and L2 caches (51). As was discussed earlier, an arbitrary amount of time can pass before a RESERVE bus operation can be propagated to the lowest level cache. It is possible for a write operation within the reservation granule to occur on the generalized interconnect after reservation has been made in the L1 cache, but before the RESERVE bus operations have been propagated to the L3 cache. In this case, the L3 cache has not been informed of the reservation and it would appear that the system could function incorrectly. This is not the case, however. Instead, the lowest-level cache, to ensure coherency, is required to propagate information about the write observed on the bus to the top of the hierarchy to ensure coherence. This will cause the L1 reservation unit to be informed of the write and thereby cause the L1 reservation unit to reset the reservation flag. In general, cache coherency requires that information about all writes (including those that occur to blocks with reservations) be propagated up the cache hierarchy of any processing unit to the highest level of the hierarchy that has a copy of the block present. Therefore, information about writes will be propagated up to the level at which a copy of the block is present, allowing the processor reservation flag to be reset when another processor executes a write to the reservation granule, even if the L3 cache has not yet been informed of the reservation.

However, if a block has been partially or completely evicted from a memory hierarchy, the cache-coherency protocol will not propagate information about writes any higher than the level of the highest cache that has a copy of the block present (the eviction of a block does not alter the validity of any reservation flags). In this case, some other mechanism must be responsible to propagate information about writes up the hierarchy to the processor in order to reset the reservation flag in the processor. This is the role of the reservation units. If a block has been evicted from a given level of the cache hierarchy, the cache no longer participates in the coherency protocol; however, the reservation does continue to participate. If the reservation unit detects a write to the block with an active reservation, the reservation unit will reset the reservation flag and propagate the information about the write up to the higher levels of the hierarchy to ensure that the semantics of the lwarx/stwcx instruction are preserved. However, until a block is evicted from a given level of the cache hierarchy, it is not necessary to involve the reservation unit due to the fact that the coherency mechanism will ensure that information about writes is propagated up to at least this level of the hierarchy. When a prior art system propagates RESERVE bus operations down the entire hierarchy on a lwarx hit, it serves only to make the reservation units ready to snoop for writes earlier than is absolutely necessary. The reservation units must snoop for writes only after the block has been removed from a given level of the cache hierarchy. Setting the reservation unit before the block is evicted is not strictly necessary.

It is important to note that, in prior-art systems, any time a lwarx instruction is executed by the processor and finds the block in the cache hierarchy, the RESERVE bus operations are propagated down through the rest of the hierarchy. This happens even if the processor already has an outstanding reservation for the block. As an example, a common synchronization primitive implemented with lwarx/stwcx, called test-and-test-and-set, first does a lwarx to a location in memory. If this location has a non-zero value, the processor branches back to the lwarx and reads the value again until it becomes zero. Once the lwarx returns a zero, the processor continues trying to change the value to one with a stwcx instruction. If this succeeds, the processor was able to read the zero, change it to one, and write it back again atomically. This procedure is the atomic read-modify-write sequence discussed earlier and sets a lock that prevents other processors from making progress (the other processors now read one and cannot proceed until they themselves have read a zero, and then have successfully modified it atomically to one). On average, a given processor will "spin" on the lwarx returning a one because some other processor already has the lock. In this case, for each lwarx that returns a one, a RESERVE operation is propagated down the entire hierarchy and onto the generalized interconnect (typically, the block with the memory location of the lock will be found in the L1 cache). The repeated broadcasting of RESERVE bus operations is known as a "lwarx storm." This imposes a severe performance degradation and is a limitation of the prior-art systems. It would, therefore, be desirable to devise a more efficient method of implementing lwarx/stwcx semantics, so as to reduce system bus traffic and achieve higher overall system performance. It would be particularly advantageous if the reserve bus operation were not required to be transmitted down the entire depth of the cache hierarchy.

SUMMARY OF THE INVENTION

It is therefore one object of the present invention to provide an improved method of handling cache-entry reservations in a multi-processor computer system.

It is another object of the present invention to provide such a method that reduces bus traffic from load-and-reserve (lwarx) instructions.

It is yet another object of the present invention to provide such a method that utilizes existing mechanisms to achieve improved performance.

The foregoing objects are achieved in a method of accessing a value from a memory device for use in a processing unit of a multi-processor computer system, generally comprising the steps of loading the value from the memory device into all of said caches, marking the highest cache which receives the value as reserved, sending a reserve bus operation from the highest cache to the second-level cache when the value is to be cast out of the highest cache, and casting out the value from the highest cache after sending the reserve bus operation to the second-level cache. This procedure is preferably used for all caches in a multi-level cache architecture, i.e., when the value is to be cast out of any given cache, a reserve bus operation is sent from the given cache to the next lower-level cache (i.e., the adjacent cache which lies closer to the bus), but the reserve bus operation is not sent to all lower caches. After sending the reserve bus operation, the value is cast out from the given cache. Any attempt by any other processing unit in the computer system to write to an address of the memory device which is associated with the value will then be forwarded to all higher-level caches. The marking of the block as reserved is removed in response to any such attempt to write to the address.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF THE PREFERRED EMBODIMENT

Figure 4:
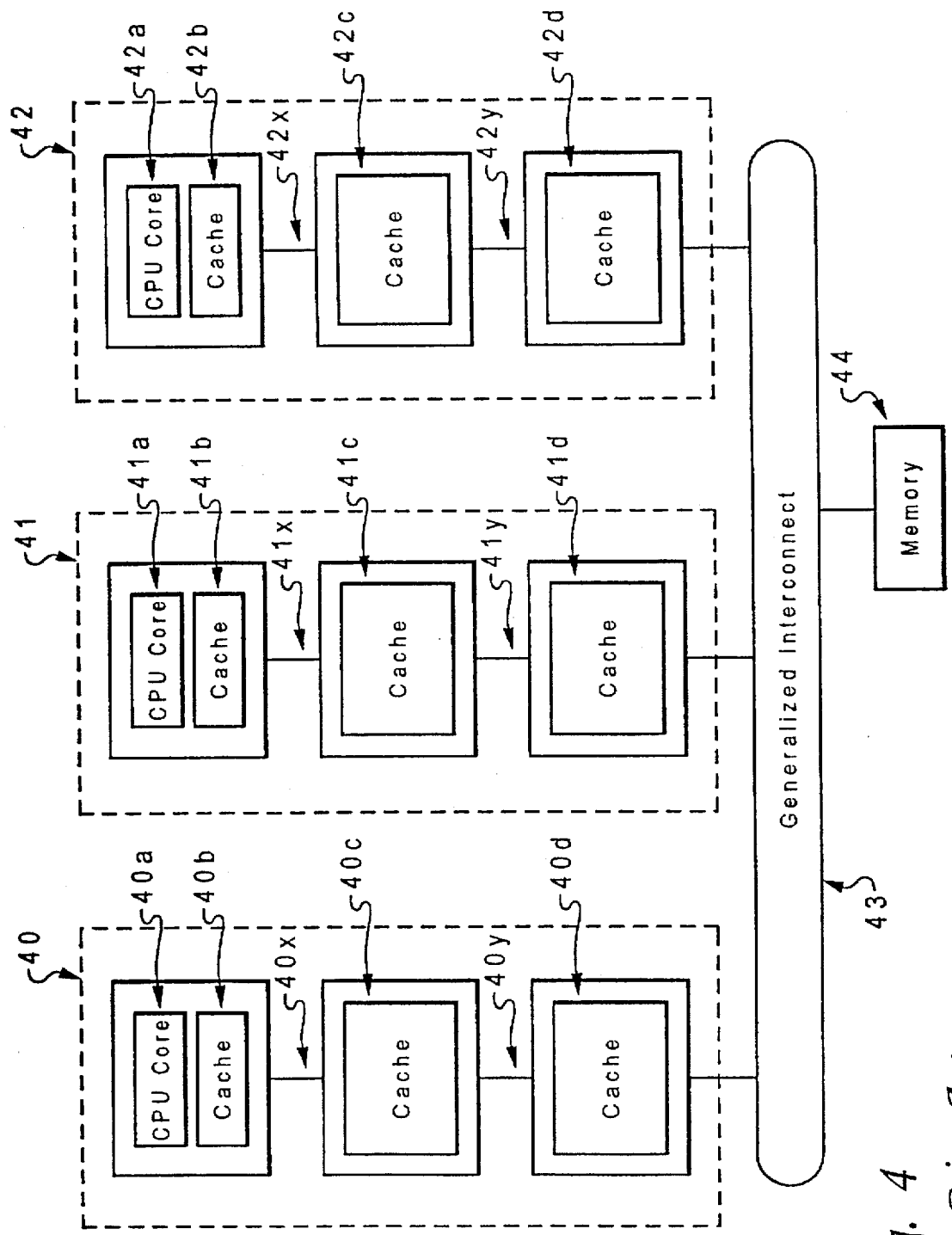
FIG. 4 is a block diagram of a conventional symmetric multiprocessor system with a multi-level cache hierarchy.
Figure 5:
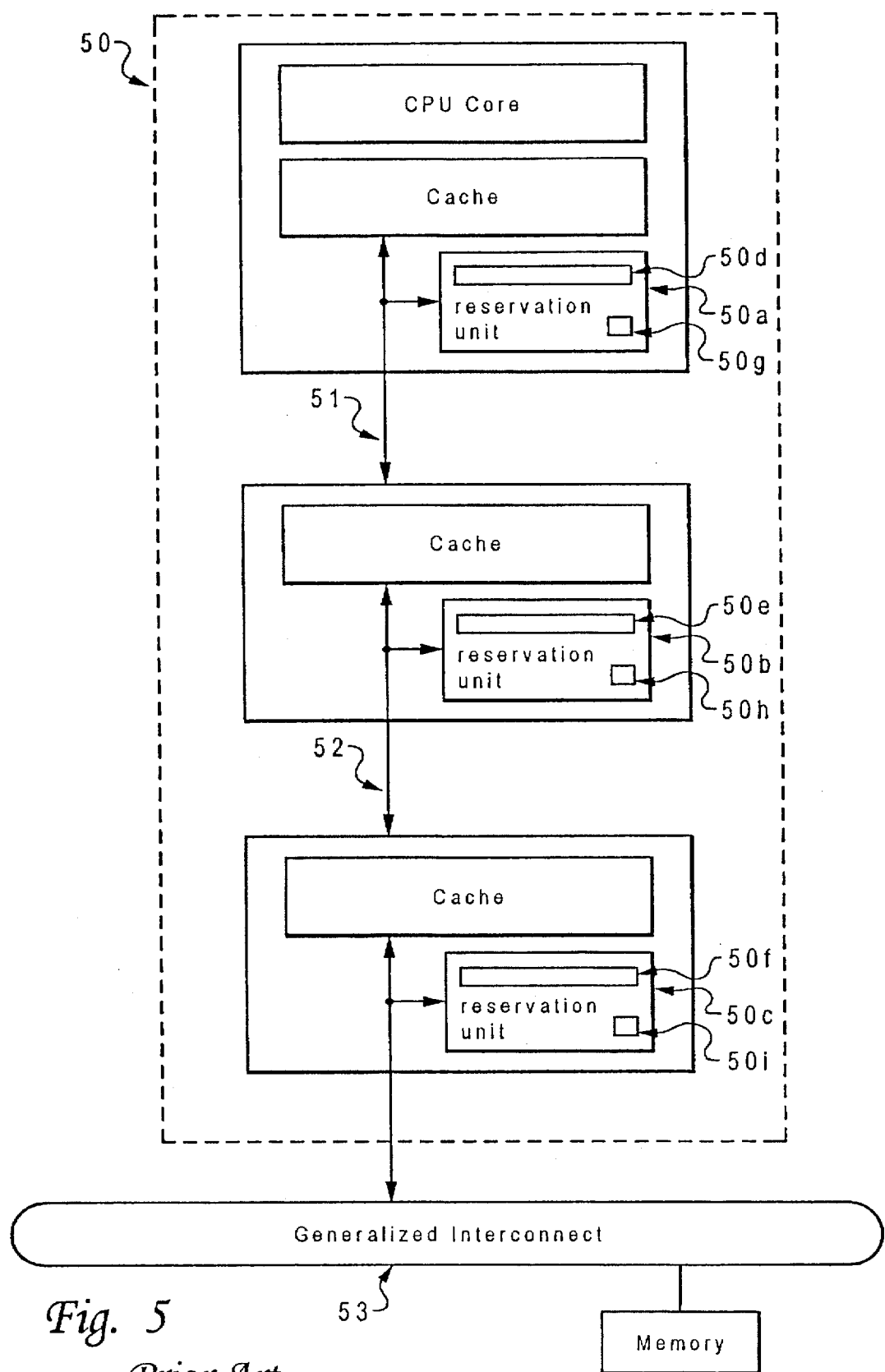
FIG. 5 is a block diagram of a conventional processing unit detailing the constructs necessary to support lwarx and stwcx instructions.

The present invention is directed to a method of handling cache reservations in a multi-processor system, such as the system of FIGS. 4 and 5, but the present invention could be applied to computer systems that are not necessarily conventional, i.e., they could include new hardware components, or have a novel interconnection architecture for existing components. Therefore, those skilled in the art will appreciate that the present invention is not limited to the generalized system shown in those figures.

As explained above, in the prior art, when the target of an LARX instruction is found at any cache level, a RESERVE bus operation is passed to all lower levels of the hierarchy to ensure that all attempted writes to the reservation granule are propagated up to higher levels in the cache hierarchy. In the present invention, this policy is altered to achieve higher performance. Specifically, when a block that corresponds to the reservation granule must be deallocated from a level (say level N), the next lower level (N+1) is informed of this by a reserve bus operation. The next lower level is informed before removal of the block is completed, to ensure that the reservation unit in the next lower level is operating before the block is removed, causing the coherency protocol to stop forwarding write operations. The reserve bus operation informs the next lower level that it must forward all transactions that attempt to write to the block to the higher level (N). The attempts to write do not need to be forwarded for cache coherence, but rather to maintain the semantics of the lwarx/stwcx instructions.

Furthermore, in the present invention, the reserve bus operation is not transmitted down the entire depth of the cache hierarchy. Unlike the prior art, the recipient of a reserve bus operation does not transmit this to the next lowest level until it is required by the eviction of the reservation granule. This approach is not strictly necessary for coherency, but serves as an optimization. It is possible to combine this novel protocol with that of the prior art. If a prior-art protocol is adopted at some level of the hierarchy, that level will merely inform the next lower level of the reservation granule address earlier than is necessary as was discussed earlier. This will not prevent the proper operation of the protocol, but will merely cause RESERVE bus operations to be propagated down the remainder of the hierarchy before strictly required.

Figure 1:
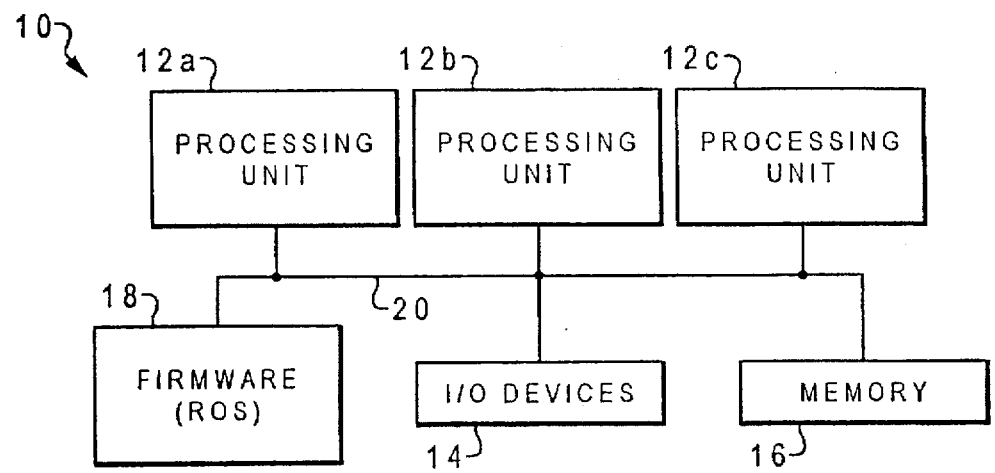
FIG. 1 is a block diagram of a prior-art multi-processor computer system.
Figure 2:
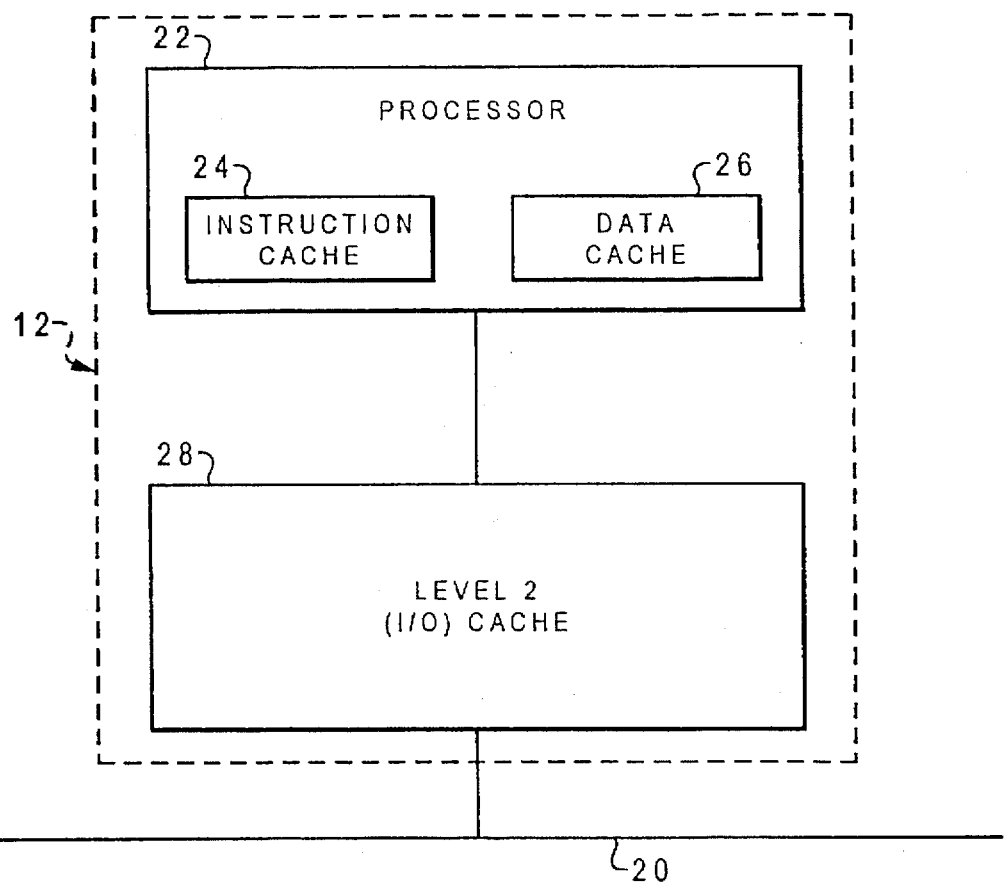
FIG. 2 is a block diagram of a prior-art processing unit having a processor with on-board instruction and data caches and a second-level cache.
Figure 3:
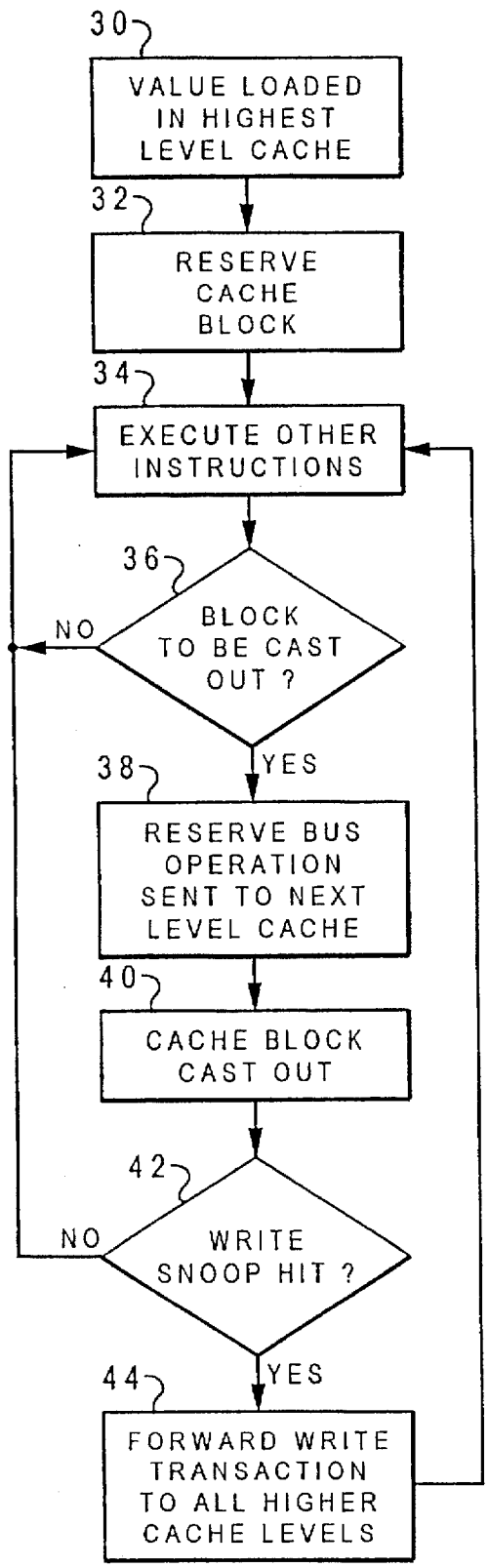
FIG. 3 is a flow chart depicting the steps associated with reserving cache entries for load-store operations.

Essentially, a reserve operation is transmitted down to a lower level of a cache hierarchy only in those cases where the lower-level hierarchy must be told explicitly to forward reservation-killing operations up because a reservation is being held on a block that no longer will be present in the higher level and, therefore, will not be protected by the cache-coherence protocol. Furthermore, the recipient of a reserve operation does not transmit this operation down to a lower level until it must be transmitted due to the castout, victimization, or snoop push of the reservation granule. These steps can be further explained with reference to the flow chart of FIG. 3.

When a processor first accesses a value to be read with a load-and-reserve instruction, that value is placed in all the cache levels, up to the highest-level cache (30). The corresponding block in the cache is marked as reserved (32). The processor then executes other instructions (34), which may or may not be related to the load-and-reserve cached value. If the value is to be evicted from the highest-level cache (36), then a reserve bus operation is sent to the next level down (38), but only the next level down (i.e., not to all lower-level caches). Otherwise the processor continues execution of other instructions until the value is to be cast out. After the reserve bus operation has been transmitted to the next lower-level cache, the block can be deallocated from the highest-level cache (40). Thereafter, the lower-level cache will monitor the bus for a snoop on the cached and reserved address. If an attempt is made to write to the block (42), it will be forwarded to the highest-level cache (44), which will remove the reservation.

If the SMP system uses processing units having more than two levels of caching, the foregoing steps apply to the lower levels as well, as indicated by the "no" branch from conditional step 42. For example, no write snoops may occur before the value is to be cast out of the L2 cache (after already having been cast out of the L1 cache). In this case, the check on casting out of the block in step 36 applies to the L2 cache. The reserve bus operation (38) is transmitted from the L2 cache to the L3 cache, and then the block is deallocated from the L2 cache (40). Any write snoop hit occurring for this address will then be forwarded to both the L2 and L1 caches from the L3 cache. This procedure can apply to any number of serially connected caches.

The present invention can significantly reduce system bus traffic for reserve operations. In SMP systems where the lwarx/stwcx instructions are executed quite often, this invention allows for higher overall system performance. Moreover, this improvement is achieved using an existing mechanism, the cache-coherency protocol to determine rights to a block which is to be reserved. Only when the cache at a given level gives up rights does it need to send the LARX reserve.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A method of accessing a value from a memory device for use in a processing unit of a multi-processor computer system, the processing unit having at least first and second caches wherein contents of the first cache are included in the second cache, comprising the steps of:
    loading the value from the memory device into all of said caches;
    marking the first cache which receives the value as reserved;
    when the value is to be cast out of the first cache, sending a reserve bus operation from the first cache to the second cache; and
    casting out the value from the first cache after said sending of the reserve bus operation to the second cache.

2. The method of claim 1 further comprising the step of the second cache forwarding, to the first cache, any attempt by any other processing unit in the computer system to write to an address of the memory device which is associated with the value.

3. The method of claim 1 wherein the processing unit has a third cache, and further comprising the steps of:
    when the value is to be cast out of the second cache, sending a reserve bus operation from the second cache to the third cache; and
    casting out the value from the second cache after said sending of the reserve bus operation to the third cache.

4. The method of claim 1 wherein the processing unit has a plurality of caches in addition to the first and second caches, all of the caches being serially connected between a processor of the processing unit and a bus of the computer system, and further comprising the steps of:
    when the value is to be cast out of any given cache, sending a reserve bus operation from the given cache to the adjacent cache which is closer to the bus; and
    casting out the value from the given cache after said sending of the reserve bus operation to the adjacent cache.

5. The method of claim 1 wherein the first cache is connected to a processor of the processing unit and to the second cache, and the second cache is further connected to a bus of the computer system.

6. The method of claim 1 comprising the further step of the processing unit storing a new value in the memory device conditioned upon the first cache still being marked as reserved.

7. The method of claim 2 wherein any attempt to write to the address of the memory device is detected using a cache-coherency protocol.

8. The method of claim 2 comprising the further step of removing the marking of the cache as reserved, in response to any attempt to write to the address.

9. The method of claim 3 further comprising the step of the third cache forwarding, to the second cache, any attempts by any other processing unit in the computer system to write to an address of the memory device which is associated with the value.

10. The method of claim 9 further comprising the step of the second cache forwarding, to the first cache, the attempts by any other processing unit to write to the address.

11. A processing unit for a computer system, comprising:
    a processor; and
    a plurality of caches for providing values to said processor, said caches being arranged in levels and adapted to send a reserve bus operation from a higher-level cache to a next lower-level cache which contains the contents of the higher-level cache, prior to casting out a reserved block from said higher-level cache.

12. The processing unit of claim 11 wherein said caches include one or more on-board caches integrally packaged with said processor.

13. The processing unit of claim 11 wherein each said cache forwards, to all higher-level caches, any attempt by another processing unit to write to an address of a memory device which is associated with said block.

14. The processing unit of claim 13 wherein each said cache changes said reserved block to a not-reserved state in response to any attempt to write to said address.

15. The processing unit of claim 14 wherein any attempt to write to said address is detected using a cache-coherency protocol.

16. A multi-processor computer system comprising:
    a memory device;
    a bus connected to said memory device; and
    a plurality of processing units each connected to said bus, at least one of said processing units having a plurality of caches arranged in levels, said caches adapted to send a reserve bus operation from a higher-level cache to a next lower-level cache which contains the contents of the higher-level cache, prior to casting out a reserved block from said higher-level cache.

17. The computer system of claim 16 wherein each said processing unit has a plurality of caches arranged in levels, all of said caches adapted to send a reserve bus operation from a higher-level cache to a next lower-level cache prior to casting out a reserved block from said higher-level cache.

18. The computer system of claim 16 wherein each said cache forwards, to all higher-level caches, any attempt by another processing unit to write to an address of a memory device which is associated with said block.

19. The computer system of claim 18 wherein each said cache changes said reserved block to a not-reserved state in response to any attempt to write to said address.

20. The computer system of claim 19 wherein any attempt to write to said address is detected using a cache-coherency protocol.

* * * * *